(12) United States Patent
Suekawa et al.

(10) Patent No.: US 10,193,445 B2
(45) Date of Patent: Jan. 29, 2019

(54) CONTROL DEVICE OF POWER SUPPLY SYSTEM AND POWER SUPPLY UNIT

(71) Applicant: DENSO CORPORATION, Kariya, Aichi-pref. (JP)

(72) Inventors: Daisuke Suekawa, Kariya (JP); Mitsunori Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 76 days.

(21) Appl. No.: 15/277,086

(22) Filed: Sep. 27, 2016

(65) Prior Publication Data
US 2017/0093284 A1 Mar. 30, 2017

(30) Foreign Application Priority Data

Sep. 28, 2015 (JP) ................. 2015-189569

(51) Int. Cl.
| | |
|---|---|
| *H02J 1/00* | (2006.01) |
| *H02J 3/00* | (2006.01) |
| *H02M 3/158* | (2006.01) |
| *H02M 7/537* | (2006.01) |
| *H02M 1/32* | (2007.01) |
| *H02M 7/493* | (2007.01) |
| *B60L 3/00* | (2006.01) |
| *H02P 27/08* | (2006.01) |

(Continued)

(52) U.S. Cl.
CPC .............. *H02M 3/158* (2013.01); *B60L 3/003* (2013.01); *H02M 1/32* (2013.01); *H02M 7/493* (2013.01); *H02M 7/537* (2013.01); *H02P 27/085* (2013.01); *B60K 6/46* (2013.01); *B60L 2210/40* (2013.01); *B60L 2240/526* (2013.01); *H02M 2003/1586* (2013.01); *H02P 27/06* (2013.01); *H02P 2209/09* (2013.01); *Y02T 10/642* (2013.01); *Y02T 10/7241* (2013.01); *Y10S 903/906* (2013.01)

(58) Field of Classification Search
CPC ...... H02M 3/158; H02M 3/155; H02M 7/537; H02P 27/08; B60L 11/14; B60L 11/1868; B60L 2210/40
USPC ....................... 307/82, 80, 9.1, 10.1, 66, 64; 318/400.22, 400.3
See application file for complete search history.

(56) References Cited

U.S. PATENT DOCUMENTS

| | | | |
|---|---|---|---|
| 9,653,998 B2 * | 5/2017 | Wu ....................... | H02M 3/158 |
| 2009/0010035 A1 * | 1/2009 | Williams .............. | H02M 3/158 |
| | | | 363/131 |

(Continued)

FOREIGN PATENT DOCUMENTS

| | | | | |
|---|---|---|---|---|
| JP | 2006-136046 A | 5/2006 | | |
| JP | 4248859 B2 | 4/2009 | | |
| JP | WO 2010140217 A1 * | 12/2010 | ............ | H02M 3/155 |

*Primary Examiner* — Fritz M Fleming
*Assistant Examiner* — Jagdeep Dhillon
(74) *Attorney, Agent, or Firm* — Oliff PLC

(57) ABSTRACT

A control device is applied for a power supply system that includes two boost converters. The two boost converters boosts inputted direct-current voltages to predetermined output voltages and output ends of the two boost converters are connected in parallel with each other. The control device includes a switching portion and a control portion. The switching portion controls switching of a switching element included in each of the two boost converters. The control portion shifts switching timings of the switching elements of the two boost converters from each other.

4 Claims, 11 Drawing Sheets

(51) Int. Cl.
*B60K 6/46* (2007.10)
*H02P 27/06* (2006.01)

(56) References Cited

U.S. PATENT DOCUMENTS

| | | | |
|---|---|---|---|
| 2012/0074919 A1 | 3/2012 | Hasegawa et al. | |
| 2012/0229061 A1* | 9/2012 | Itoh | B60L 3/003 |
| | | | 318/400.3 |
| 2013/0057188 A1* | 3/2013 | Takamatsu | H02M 1/42 |
| | | | 318/459 |
| 2013/0257754 A1* | 10/2013 | Liu | G06F 3/0416 |
| | | | 345/173 |
| 2014/0001990 A1* | 1/2014 | Takamatsu | H02P 27/08 |
| | | | 318/400.22 |
| 2014/0125264 A1* | 5/2014 | Nakamura | H02P 6/10 |
| | | | 318/400.23 |
| 2015/0280423 A1* | 10/2015 | Bremicker | H02M 1/32 |
| | | | 307/71 |
| 2016/0322898 A1* | 11/2016 | Bianco | H02M 1/4225 |

* cited by examiner

FIG. 6A

| 2 MG + 1 BOOST | |
|---|---|
| MG1 SURGE | 150 |
| MG2 SURGE | 175 |
| BOOST SURGE | 200 |
| VH | 650 |
| SUPERIMPOSED VOLTAGE | 1175 |

FIG. 6B

| 2 MG + 2 BOOST | |
|---|---|
| MG1 SURGE | 150 |
| MG2 SURGE | 175 |
| MASTER BOOST SURGE | 200 |
| SLAVE BOOST SURGE | 200 |
| VH | 650 |
| SUPERIMPOSED VOLTAGE | 1375 |

FIG. 6C

| 2 MG + 2 BOOST | |
|---|---|
| MG1 SURGE | 150 |
| MG2 SURGE | 175 |
| MASTER BOOST SURGE | 200 |
| SLAVE BOOST SURGE | 200 |
| VH | 475 |
| SUPERIMPOSED VOLTAGE | 1200 |

FIG. 7A

| VL | | VH VOLTAGE | | DM [%] | |
|---|---|---|---|---|---|
| MAX | 400 | MAX | 650 | SYSTEM REQUIREMENT | 61.5 | |
| | | MIN | 400 | =VL VOLTAGE | 100.0 | $=V_L/V_H$ |
| MIN | 200 | MAX | 650 | SYSTEM REQUIREMENT | 30.8 | |
| | | MIN | 200 | =VL VOLTAGE | 100.0 | |

FIG. 7B

| VL | | VH VOLTAGE | | DM [%] | |
|---|---|---|---|---|---|
| MAX | 400 | MAX | 650 | SYSTEM REQUIREMENT | 61.5 | |
| | | MIN | 475 | MINIMUM VALUE | 84.2 | $=V_L/V_H$ |
| MIN | 200 | MAX | 650 | SYSTEM REQUIREMENT | 30.8 | |
| | | MIN | 475 | MINIMUM VALUE | 42.1 | |

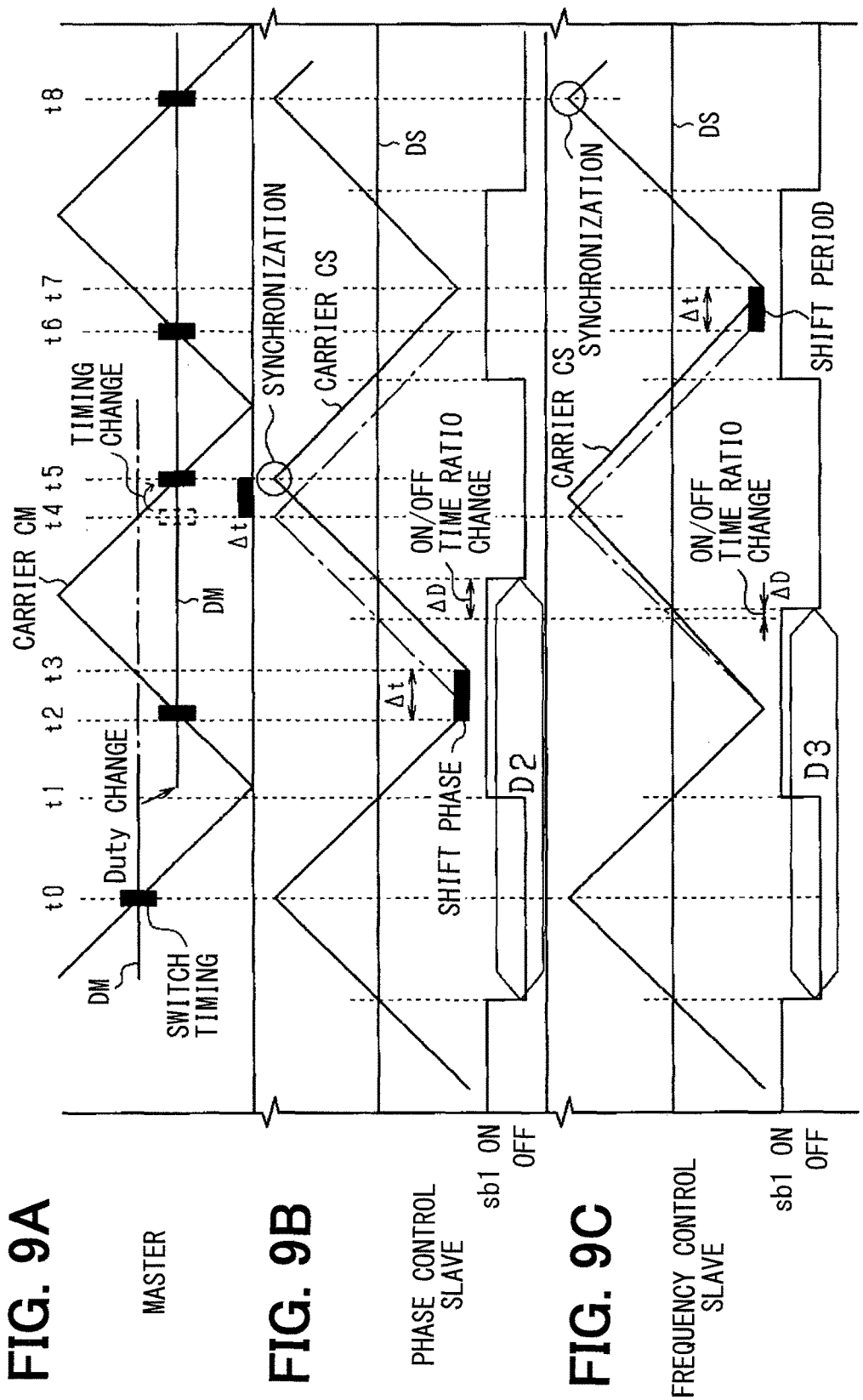

CONTROL DEVICE OF POWER SUPPLY SYSTEM AND POWER SUPPLY UNIT

CROSS REFERENCE TO RELATED APPLICATIONS

The present application is based on Japanese Patent Application No. 2015-189569 filed on Sep. 28, 2015, the disclosure of which is incorporated herein by reference.

TECHNICAL FIELD

The present disclosure relates to a control device applied for a power supply system including two boost converters, and a power supply unit including two boost converters.

BACKGROUND

Conventionally, a system in which a direct-current (DC) power is boosted by a boost converter, the boosted DC power is converter into an alternating-current (AC) power by an inverter, and the converted AC power is supplied to an AC motor is employed, for example, in a hybrid vehicle. Some of such systems includes two boost converters in parallel with an inverter. For example, in a system disclosed in JP 5446054 B2 (corresponding to US 2012/0074919 A1), a boost converter connected with a fuel cell and a boost converter connected with a battery are disposed in parallel with an inverter.

If an output side includes two boost converters which are parallel to each other, like the system disclosed in JP 5446054 B, the two boost converters share a high voltage line. Thus, if switching timings of the two boost converters overlap each other, surge voltages of the two boost converters are superimposed and the surge voltage becomes large. As a result, a voltage applied to switching elements may exceed a breakdown voltage. Especially, in a case where the two boost converters are formed as one unit, a wiring connecting the two boost converters becomes short. Thus, when the surge voltages of the two boost converters are superimposed, the surge voltage is likely to be large. The surge voltage of each of the boost converters is restricted when a switching speed is reduced, however a switching loss increases.

SUMMARY

It is an object of the present disclosure to provide a control device of a power supply system and a power supply unit that can restrict a surge voltage while restricting a loss.

According to an aspect of the present disclosure, a control device applied for a power supply system that includes two boost converters is provided. The two boost converters boost inputted direct-current voltages to predetermined output voltages and output ends of the two boost converters are connected in parallel with each other. The control device includes a switching portion and a control portion. The switching portion controls switching of switching elements included in the two boost converters. The control portion shifts switching timings of the switching elements of the two boost converters from each other.

In the power supply system, the output ends of the two boost converters are connected in parallel with each other, and the two boost converters share a high voltage line. Thus, if the switching timings of the two boost converter overlap each other, the surge voltages of the two boost converter are superimposed, and the surge voltage becomes large. However, because the switching timings of the two boost converters are shifted from each other, generation timings of the surge voltages of the two boost converters are also shifted from each other. Thus, the surge voltage can be restricted without reducing the switching speed. In other words, a superimposition of the surge voltages of the two boost converters is restricted, and the surge voltage can be restricted while restricting a loss.

According another aspect of the present disclosure, a power supply unit includes two boost converters, an inverter, and a control device. The two boost converters boost inputted direct-current voltages to predetermined output voltages. the inverter is connected to output ends of the two boost converters and converts the output voltages of the two boost converters to alternating-current voltages. The control device controls operations of the two boost converters and the inverter, and includes a switching portion and a control portion. The switching portion controls switching of switching elements included in the two boost converters. The control portion shifts switching timings of the switching elements of the two boost converters from each other.

In the above-described power supply unit, the two boost converters, the inverter, and the control device are formed as one unit. The wiring connecting the two boost converter is shorter compared with a case where two boost converters are formed as separate units. Thus, if the surge voltages are superimposed on a high voltage line shared by the two boost converters, the surge voltage is likely to be large. However, in the above-described power supply unit, because the switching timings of the two boost converters are shifted from each other, generation timings of the surge voltages of the two boost converters are also shifted from each other. Thus, the surge voltage can be restricted while restricting a loss.

BRIEF DESCRIPTION OF THE DRAWINGS

Additional objects and advantages of the present disclosure will be more readily apparent from the following detailed description when taken together with the accompanying drawings. In the drawings:

FIG. 6A is a diagram showing surge voltages and a superimposed voltage on a high voltage line in a motor system that includes two MGs and one converter;

FIG. 6B is a diagram showing surge voltages and a superimposed voltage on a high voltage line in a motor system that includes two MGs and two converters;

FIG. 6C is a diagram showing surge voltages and a superimposed voltage on a high voltage line in a motor system that includes two MGs and two converters;

FIG. 7A is a diagram showing a duty range depending on a power supply system;

FIG. 7B is a diagram showing a duty range in which a superimposition of surge voltages need to be avoided;

FIG. 9A is a diagram showing switching timings of masters according to a first embodiment and a second embodiment;

FIG. 9B is a diagram showing switching timings of a slave according to the first embodiment;

FIG. 9C is a diagram showing switching timings of a slave according to the second embodiment;

DETAILED DESCRIPTION

The following describes embodiments in which a control device of a power supply system and a power supply unit are embodied with reference to the drawings. The control device and the power supply unit according to each of the embodiments are assumed to be applied to a hybrid vehicle. In each of the embodiments, same or equivalent components are denoted by the same reference sign, and the following description is applied to the component with the same reference sign.

(First Embodiment)

Figure 1:
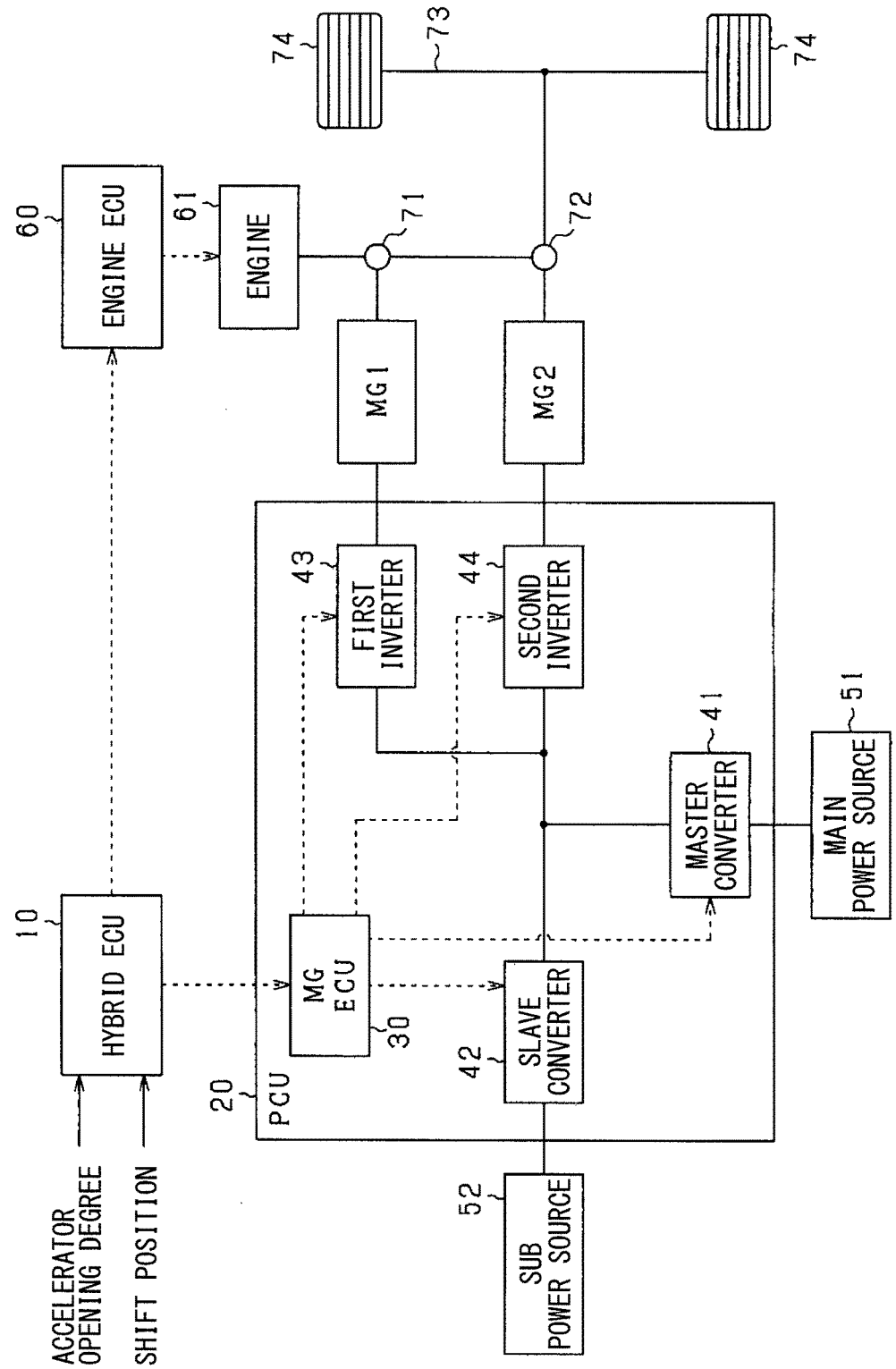
FIG. 1 is a diagram showing a schematic configuration of a hybrid vehicle.

A configuration of a hybrid vehicle according to a first embodiment will be described with reference to FIG. 1. The hybrid vehicle according to the present embodiment includes an engine 61, an engine ECU 60, an MG1, an MG2, a power control unit (PCU) 20, a main power source 51, a sub power source 52, and a hybrid ECU 10.

The engine 61 is a travelling power source and is connected with an axle 73 that connects two wheels 74 via a power dividing mechanism 71 and a decelerating mechanism 72. The engine ECU 60 controls the engine 61 based on an engine required power transmitted from the hybrid ECU 10 that is a superordinate ECU. Specifically, the engine ECU 60 controls a throttle opening degree based on the engine required power.

Each of the MG1 and the MG2 is a three-phase motor generator that works as a motor and a generator. The MG1 mainly works as the generator. The MG1 is connected with the engine 61 and the decelerating mechanism 72 via the power dividing mechanism 71. When the MG1 works as the generator, the MG1 generates power by driven by an output of the engine 61 input to a rotation axis via the power dividing mechanism 71. The power generated by the MG1 is supplied to the MG2 or is supplied to the main power source 51 and the sub power source 52 via the PCU 20.

The MG2 mainly works as the motor and works as the generator that performs regenerative power generation at deceleration of the vehicle. The MG2 is connected with the axle 73 via the decelerating mechanism 72. When the MG2 works as the motor, the power of the MG2 is transferred to the wheels 74 via the decelerating mechanism 72 and becomes a travelling power of the vehicle. When the MG2 works as the generator, the power generated by the MG2 is supplied to the main power source 51 and the sub power source 52 via the PCU 20. The hybrid vehicle according to the present embodiment includes two motor generators. However, the hybrid vehicle needs to include at least one motor generator.

The PCU 20 is connected with the MG1 and the MG2. The PCU 20 controls the power supplied to the MG1 and the MG2 and controls operations of the MG1 and the MG2. The PCU 20 is a unit in which a master converter 41, a slave converter 42, a first inverter 43, a second inverter 44, and an MGECU 30 are integrally formed. In the present embodiment, the PCU 20 corresponds to a power supply unit.

Each of the master converter 41 and the slave converter 42 is a boost converter that boosts an inputted voltage to a predetermined voltage. The main power source 51 is connected between input terminals of the master converter 41. The main power source 51 is a high voltage battery of a voltage VL1 such as a lithium ion battery. The sub power source 52 of a voltage VL2 such as a large-capacity capacitor is connected between input terminals of the slave converter 42. An output of the sub power source 52 supplements an output of the main power source 51 and improves an acceleration of the vehicle. An input end of the master converter 41 and an input end of the slave converter 42 may be connected in parallel to the same battery.

Output ends of the master converter 41 and the slave converter 42 are connected in parallel with each other. Input ends of the first inverter 43 and the second inverter 44 are connected with the output ends of the master converter 41 and the slave converter 42 so as to be parallel to each other. An output end of the first inverter 43 is connected with the MG1 and an output end of the second inverter 44 is connected with the MG2. Thus, a motor system of the hybrid vehicle according to the present embodiment includes two MG and two boost converters. When the hybrid vehicle includes only one motor generator, the PCU 20 has a configuration in which one inverter is connected to the output ends of the master converter 41 and the slave converter 42. In the present embodiment, a power supply system is constituted of the master converter 41 and the slave converter 42.

The MGECU 30 corresponds to a control device of the power supply system. The MGECU 30 control operations of the master converter 41, the slave converter 42, the first inverter 43, and the second inverter 44 based on a torque command value transmitted from the hybrid ECU 10 that is a superordinate ECU. In other words, the MGECU 30 outputs driving signals to switching elements included in the master converter 41, the slave converter 42, the first inverter 43, and the second inverter 44 so as to control on-off states of the switching elements.

The hybrid ECU 10 is the superordinate ECU of the engine ECU 60 and the MGECU 30. The hybrid ECU 10 calculates the engine required power, the torque command value of the MG1, and the torque command value of the MG2 based on the request of a driver, a state of the vehicle, and states of charges of the main power source 51 and the sub power source 52. The hybrid ECU 10 transmits the calculated engine required power to the engine ECU 60 and transmits the calculated torque value of the MG1 and the calculated torque value of the MG2 to the MGECU 30.

Figure 2:
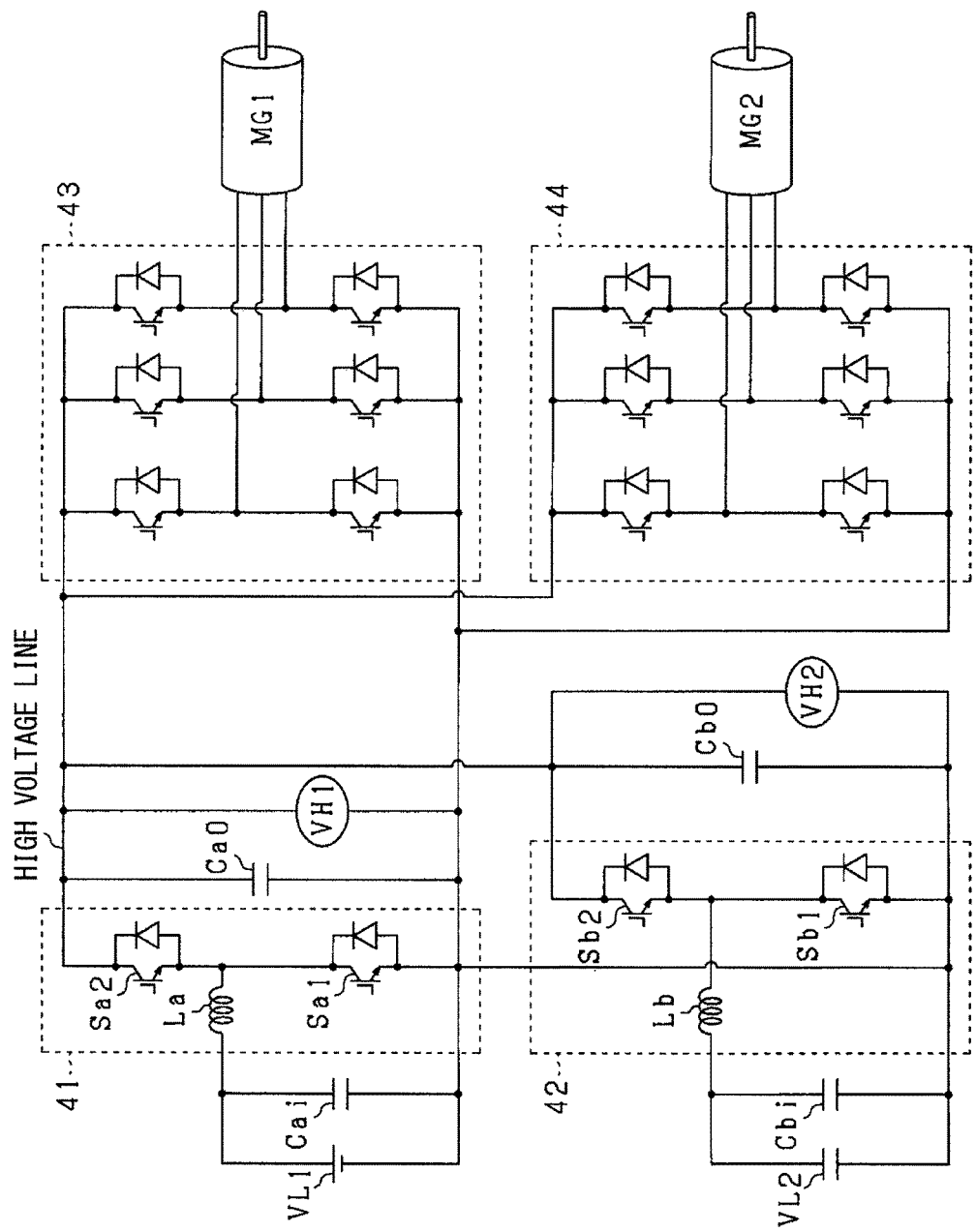
FIG. 2 is a diagram showing a configuration of a motor system.

Next, detailed configurations of the master converter 41, the slave converter 42, the first inverter 43, and the second inverter 44 will be described with reference to FIG. 2. The master converter 41 and the slave converter 42 have the same configuration, and the first inverter 43 and the second inverter 44 have the same configuration. Thus, the configurations of the master converter 41 and the first inverter 43 will be described as representatives.

The master converter 41 is a boost chopper circuit and includes a coil La and switching elements Sa1, Sa2. A first end of the coil La is connected with a positive electrode terminal of the main power source 51, and a second end of the coil La is connected with a connection point of the switching element Sa1 and the switching element Sa2. The switching element Sa1 and the switching element Sa2 are connected in series. The switching element Sa1 is a lower arm and the switching element Sa2 is an upper arm. Each of the switching elements Sa1, Sa2 is, for example, an IGBT and is connected inversely parallel with a diode. Gate terminals of the switching elements Sa1, Sa2 are connected with gate driving circuits which are not shown.

The switching elements Sa1, Sa2 are driven when operation signals ga1, ga2 transmitted from the MGECU 30 are input to the gate driving circuit. In the present embodiment, the switching elements Sa1, Sa2 are driven complementarily. Hereafter, a timing from on to off of the switching element Sa1 is also a timing from off to on of the switching element Sa2, and a timing from off to on of the switching element Sa1 is also a timing from on to off of the switching element Sa2. Similar relations are satisfied also between switching elements Sb1, Sb2.

An input end of the master converter 41 is connected with an input capacitor Cai in parallel with the main power source 51. An output end of the master converter 41 is connected with a smoothing capacitor Cao in parallel with a series-connection body of the switching element Sa1 and the switching element Sa2. A voltage between terminals of the smoothing capacitor Cao is detected as an output voltage VH1 of the master converter 41 by a voltage sensor. Similarly, a voltage between terminals of a smoothing capacitor Cbo of the slave converter 42 is detected as an output voltage VH2 of the slave converter 42 by the voltage sensor.

When a duty command value of the switching element Sa1 of the master converter 41 is set to DM, the output voltage VH1=VL1/DM. Similarly, when a duty command value of the switching element Sb1 of the slave converter 42 is set to DS, the output voltage VH2=VL2/DS. The duty command value DM and the duty command value DS are independently calculated. When the voltage VL1 or the voltage VL2 change, the duty command value DM or the duty command value DS change accordingly. In a steady state, the output voltage VH1 and the output voltage VH2 are equal to each other.

The first inverter 43 is a three-phase inverter including six switching elements. Each of the switching elements is, for example, an IGBT and is connected inversely parallel with a diode. Each phase is constituted of a series-connection body of the two switching elements. A connection point of the two switching elements of each phase is connected with a coil of each phase of the MG1.

Figure 3:
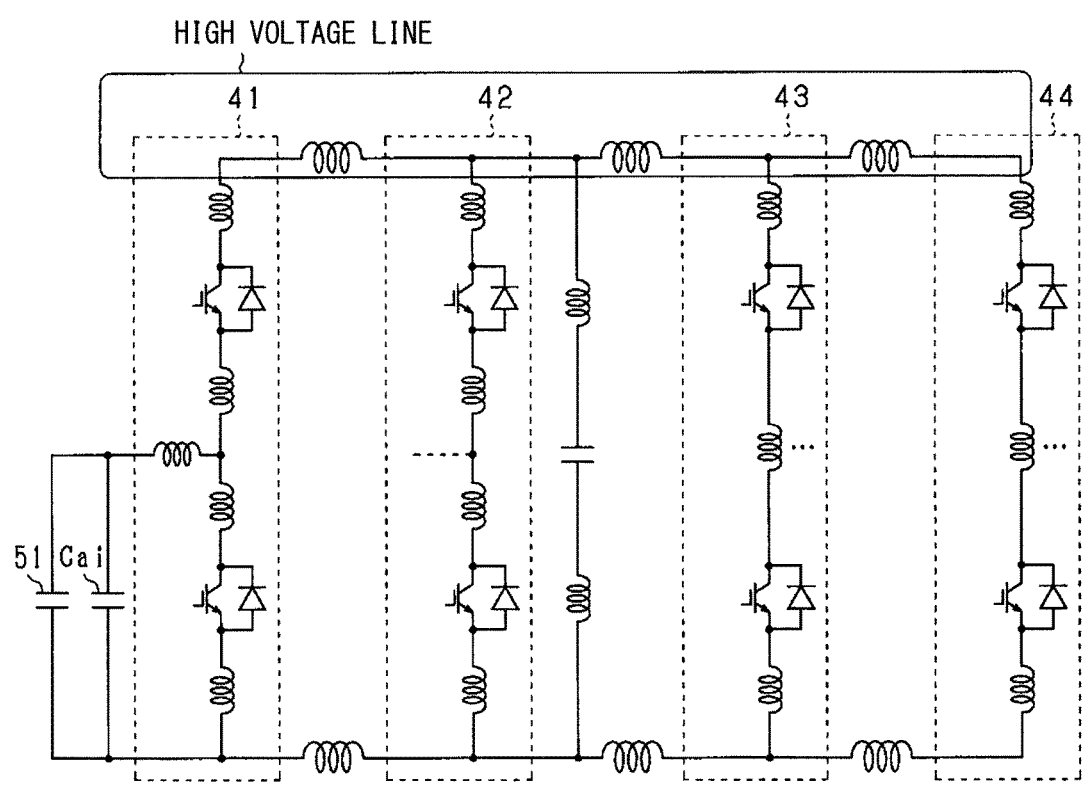
FIG. 3 is a diagram showing a high voltage line shared by two boost converters and two inverters.

As shown in FIG. 3, the master converter 41, the slave converter 42, the first inverter 43, and the second inverter 44 share a high voltage line to which a high voltage is applied. Furthermore, as shown in FIG. 3, wirings connecting the switching elements have inductance components. Thus, when each of the switching elements is switched from on to off or off to on, a surge voltage associated with the inductance component is generated, and the surge voltage is applied to the common high voltage line. Thus, when the switching timings of the switching elements Sa1, Sa2 of the master converter 41 and the switching timings of the switching elements Sb1, Sb2 of the slave converter 42 overlap, the surge voltages of two converters are superimposed on the common high voltage line.

In a case where the master converter 41 and the slave converter 42 are not housed in the same unit, and are connected via a relatively long connection wiring, due to an impedance of the connection wiring, the surge voltages applied to the common high voltage line via the connection wiring are reduced. Thus, even when the surge voltages of the two converters are superimposed on the common high voltage line, a voltage over a breakdown voltage is less likely to be applied to the switching elements. However, in a case where the master converter 41 and the slave converter 42 are housed in the same unit as the present embodiment, a connection wiring that connects the master converter 41 and the slave converter 42 becomes a relatively short. Thus, when the surge voltages of the two converters are superimposed on the common high voltage line, the surge voltage becomes large, and a voltage over the breakdown voltage may be applied to the switching elements.

When switching speeds of the switching elements Sa1, Sa2 and the switching elements Sb1, Sb2 are reduced, the surge voltage of each of the converters can be reduced. When the surge voltage of each of the converters are reduced, even when the surge voltages of the two converters are superimposed on the common high voltage line, a voltage over the breakdown voltage is less likely to be applied to the switching elements. However, when the switching speeds of the switching elements are reduced, a loss increases, and a fuel consumption of the vehicle deteriorates.

Thus, the MGECU 30 shifts the switching timings of the switching elements Sa1, Sa2 of the master converter 41 and the switching timings of the switching elements Sb1, Sb2 of the slave converter 42 from each other. It can be considered to perform a switching arbitration control in which a duty of the switching elements of one converter is simply changed when the switching timings of the two switching converters overlap each other.

However, when the switching arbitration control is performed, because the duty of the one converter is deviated from the duty command value, the output voltage of the one converter does not follow a voltage command value VH*. As a result, a difference is generated between the output voltages of the two converters, and a current balance between the two converters may break down. Eventually, an overvoltage may occur in a converter in which more electric current flows. Thus, the MGECU 30 shifts the timing at which the surge voltage occurs in the master converter 41 and the timing at which the surge voltage occurs in the slave converter 42 from each other. The following describes a function of the MGECU 30 that controls the operations of the master converter 41 and the slave converter 42.

Figure 4:
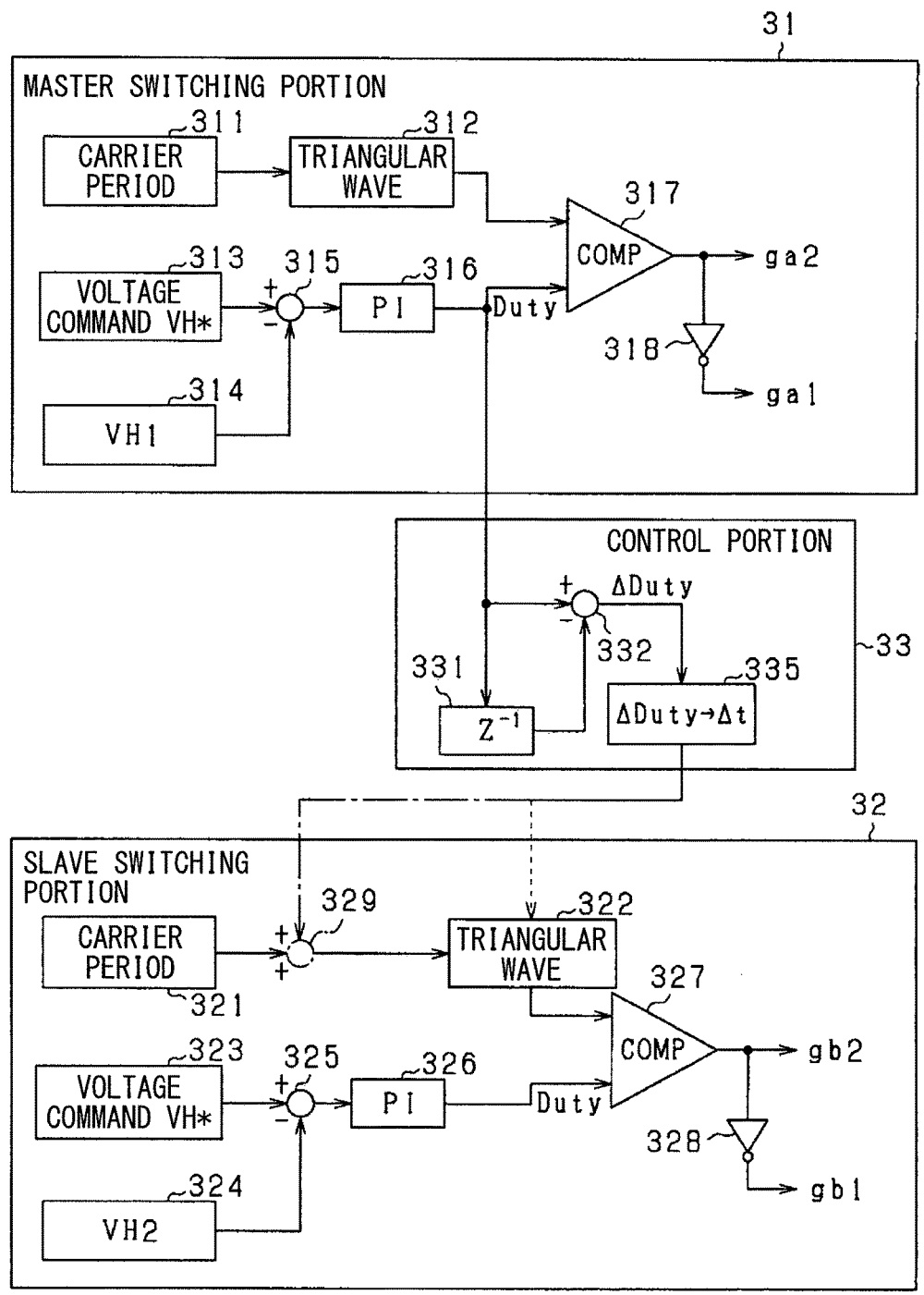
FIG. 4 is a diagram showing a part of a function of an MGECU.

A part of the function of the MGECU 30 is shown in FIG. 4. The MGECU 30 includes functions of a master switching portion 31, a slave switching portion 32, and a control portion 33. The master switching portion 31 and the slave switching portion 32 correspond to switching portions. The MGECU 30 further includes a function of controlling switching of the switching elements of the first inverter 43 and the second inverter 44 in addition to the above-described functions.

The master switching portion 31 controls switching of the switching elements Sa1, Sa2 of the master converter 41. The slave switching portion 32 controls switching of the switching elements Sb1, Sb2 of the slave converter 42. Specifically, the master switching portion 31 includes a carrier period setting portion (CARRIER PERIOD) 311, a triangular wave generating portion (TRIANGULAR WAVE) 312, a voltage command portion (VOLTAGE COMMAND VH*) 313, a voltage acquiring portion (VH1) 314, a deviation calculating portion 315, a PI control portion (PI) 316, a comparing portion (COMP) 317, and an inverting portion 318.

The carrier period setting portion 311 sets a period Ts of a carrier. The triangular wave generating portion 312 generates a carrier CM (carrier wave) that is a triangular wave having the period Ts. The voltage command value 313 generates the voltage command value VH* to the master converter 41 based on the torque command value transmitted from the hybrid ECU 10. The voltage acquiring portion 314 acquires the output voltage VH1 of the master converter 41. The deviation calculating portion 315 calculates a deviation of the voltage command value VH* and the output voltage VH1. The PI control portion 316 calculates the duty command value DM from the deviation by a proportional integral control. The calculated duty command value becomes the duty command value that indicates an on-time of the switching element Sa1 of the lower arm.

Figure 5:
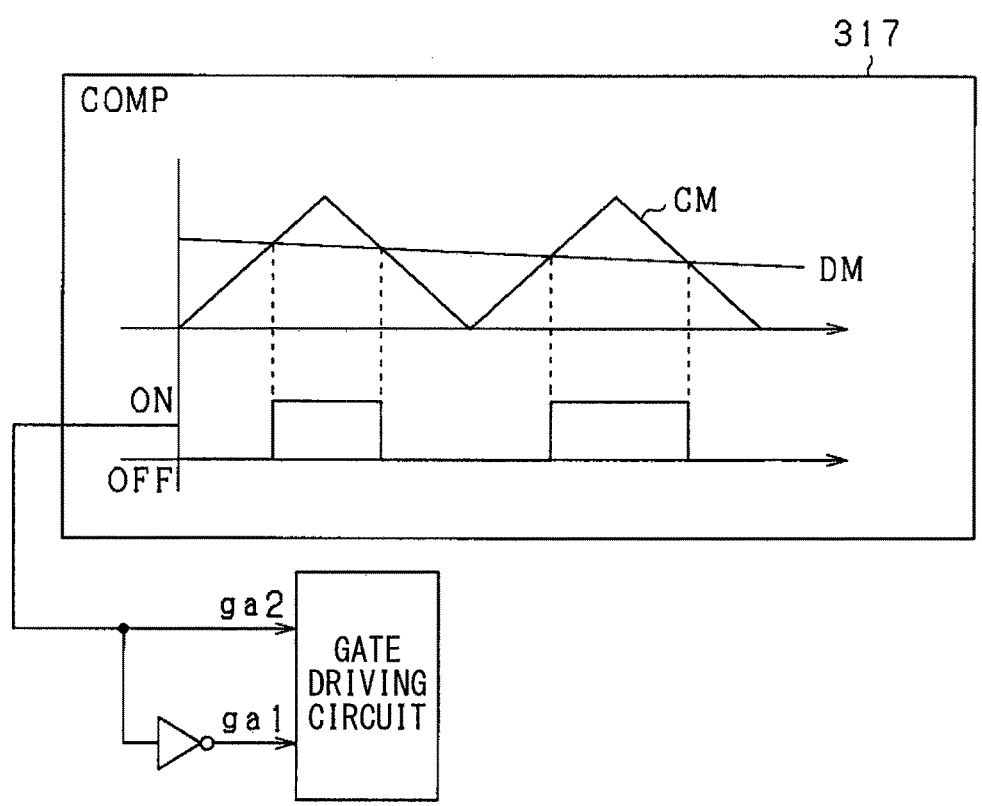
FIG. 5 is a diagram showing a processing of a comparing portion.

As shown in FIG. 5, the comparing portion 317 compares the generated carrier CM and the calculated duty command value DM and generates the operation signal ga2 to the switching element Sa2. A timing of an intersection of the carrier CM and the duty command value DM becomes a switching timing from on to off or from off to on of the switching element Sa2. Specifically, an intersection at which a state changes from a state where the carrier CM is larger than the duty command value DM to a state where the carrier CM is smaller than the duty command value becomes a timing of switching the switching element Sa2 from on to off. On the other hand, an intersection at which a state changes from a state where the carrier CM is smaller than the duty command value DM to a state where the carrier CM is larger than the duty command value DM becomes a timing of switching the switching element Sa2 from off to on.

The comparing portion 317 generates the operation signal ga2 to the switching element Sa2 based on the comparison of the carrier CM and the duty command value DM, and outputs the operation signal ga2 to the gate driving circuit of the switching element Sa2 and the inverting portion 318. The inverting portion 318 inverts the operation signal ga2 to generate the operation signal ga1 to the switching element Sa1. In other words, the inverting portion 318 sets an on-period of the operation signal ga2 to an off-period of the operation signal ga1, and sets an off-period of the operation signal ga2 to an on-period of the operation signal ga1.

The slave switching portion 32 includes a carrier period setting portion (CARRIER PERIOD) 321, a triangular wave generating portion (TRIANGULAR WAVE) 322, a voltage command portion (VOLTAGE COMMAND VH*) 323, a voltage acquiring portion (VH2) 324, a deviation calculating portion 325, a PI control portion (PI) 326, a comparing portion (COMP) 327, and an inverting portion 328, in a manner similar to the master switching portion 31. The carrier period setting portion 321 sets the same period Ts as the carrier period setting portion 311, and the triangular wave generating portion 322 generates a carrier CS that is a triangular wave having the period Ts. The slave switching portion 32 generates operation signals gb1, gb2 to the switching elements Sb1, Sb2 and outputs the generated operation signals gb1, gb2 to the gate driving circuits of the switching elements Sb1, Sb2.

The control portion 33 shifts the switching timings of the switching elements Sa1, Sa2 of the master converter 41 and the switching timings of the switching elements Sb1, Sb2 of the slave converter 42 from each other. Specifically, the control portion 33 synchronizes a switching timing from on to off or from off to on of one of the switching elements in one of the two converters and a crest or a trough of the carrier of the other of the two converters. Hereafter, the switching timing from on to off of the switching element is referred to as an off-timing, and a switching timing from off to on is referred to as an on-timing. For example, the control portion 33 synchronizes an off-timing or an on-timing of the switching element Sa1 of the master converter 41 and a crest or a trough of the carrier CS of the slave converter 42.

As described above, the timing of the intersection of the carrier and the duty command value becomes the switching timing. Thus, the timing of the crest or the trough of the carrier does not become a switching timing. Therefore, for example, when the off-timing of the switching element Sa1 and the timing of the crest of the carrier CS are synchronized, the on-timing of the switching element Sa1, that is, the off-timing of the switching element Sa2 does not overlap the switching timing of the switching element Sb1. In such a case, the on-timing of the switching element Sa1 does not overlap the switching timing of the switching element Sb1 either. Specifically, in a switching timing region corresponding to a duty range in which an output voltage VH over a threshold value is generated, the on-timing of the switching element Sa1 does not overlap the on-timing and the off-timing of the switching element Sb1. The output voltage VH1 and the output voltage VH2 at a time when the outputs are balanced is referred to as the output voltage VH.

FIG. 6A shows surge voltages and a superimposed voltage in which the surge voltages are superimposed on the output voltage VH in a case where a motor system includes two MGs and one boost converter. FIG. 6B and FIG. 6C show the surge voltages and the superimposed voltage in the motor system according to the present embodiment. The values shown in FIG. 6A-6C are examples and are not limited. A breakdown voltage of each of the switching elements is set to 1200 V, as an example.

As shown in FIG. 6A, when the surge voltage of the MG1 is 150 V, the surge voltage of the MG2 is 175 V, the surge voltage of the boost converter is 200 V, and the maximum value of the output voltage VH depending on a system requirement is 650 V, the superimposed voltage is 1175 V which is less than the breakdown voltage of the switching elements. Thus, even when the surge voltages are superimposed on the output voltage VH, there is no risk that a voltage over the breakdown voltage is applied to the switching element regardless of the output voltage VH of the boost converter.

As shown in FIG. 6B, when the number of the boost converter is increased from one to two, a surge voltage increases by the amount for one boost converter, and the superimposed voltage becomes 1375 V. Thus, depending on the output voltage VH, when the surge voltages are superimposed on the output voltage VH, a voltage over the breakdown voltage may be applied to the switching elements. Next, as shown in FIG. 6C, when the output voltage VH is reduced to 475 V, the surge voltage is 1200 V. Thus, even when the surge voltages are superimposed on the output voltage VH, the superimposed voltage does not exceed the breakdown voltage of the switching elements. Thus, in a where two boost converters are provided, if the output voltage VH is set to be less than 475 V (a threshold value), there is no risk that a voltage over the breakdown voltage is applied to the switching elements even when the surge voltages are superimposed on the output voltage VH.

In other words, in a case where the master converter 41 and the slave converter 42 are operated in a duty range in which the output voltage VH is less than 475 V, there is no risk that a voltage over the breakdown voltage is applied to the switching elements even when the switching timing of the master converter 41 and the switching timing of the slave converter 42 overlap each other. However, in a case where the master converter 41 and the slave converter 42 are operated in a range in which the output voltage VH is higher than 475 V, the switching timing of the master converter 41 and the switching timing of the slave converter 42 needs to be shifted.

FIG. 7A shows a range of the duty command value DM of the master converter 41 corresponding to the entire range of the output voltage VH. FIG. 7B shows a range of the duty command value DM of the master converter 41 corresponding to a range of the output voltage VH from 475 V to 650 V. The range of the output voltage VH from 475 V to 650 V is a range in which a superimposition of the surge voltages of the two boost converter needs to be avoided. As an example, the maximum value and the minimum value of the voltage VL1 of the main power source 51 are set to 400 V and 200 V, respectively.

As shown in FIG. 7A, when the voltage VL1 is 400 V, which is a maximum value, the output voltage VH is in a range from 400 V to 650 V which is a maximum value. The range of the duty command value corresponding to the above-described range of the output voltage VH is from 61.5% to 100%. When the voltage VL2 is 200 V, which is a minimum value, the output voltage VH is in a range from 200 V to 650 V. The range of the duty command value corresponding to the above-described range of the output voltage VH is 30.8% to 100%. Thus, in a case where the master converter 41 is operated in the entire range depending on the voltage VL1 and the system, the range of the duty command value DM is from 30.8% to 100%.

On the other hand, as shown in FIG. 7B, when the voltage VL1 is 400 V, which is the maximum value, the range of the duty command value DM corresponding to the range of the output voltage VH from 475 V to 650 V is from 61.5% to 84.2%. When the voltage VL1 is 200V, which is the minimum value, the range of the duty command value DM corresponding to the range of the output voltage VH from 475 V to 650 V is from 30.8% to 42.1%. Thus, the range of the duty command value DM in which a superimposition of the surge voltages of the two boost converters needs to be avoided is from 30.8% to 84.2%. In other words, the range of the duty command value from 84.2% to 100% is a range in which a superimposition of the surge voltages of the two boost converters does not need to be avoided.

The range of the duty command value in which a superimposition of the surge voltages of the two boost converters needs to be avoided is set to a control range DMR, a minimum duty in the control range DMR is set to DMmin, and a maximum duty in the control range DMR is set to DMmax. Similarly, a control range DSR of the duty command value DS of the slave converter 42 is calculated. A minimum duty in the control range DSR of the duty command value is set to DSmin, and a maximum duty in the control range DSR is set to DSmax. The control range DMR of the duty command value DM and the control range DSR of the duty command value DS depend on the breakdown voltage of the switching elements, the available ranges of the voltages VL1, VL2, and the maximum value of the output voltage VH which depends on the motor system.

As described above, the voltage applied to the switching elements is controlled to be less than the breakdown voltage unless a switching timing region MX of the master converter 41 corresponding to the control range DMR and a switching timing region SX of the slave converter 42 corresponding to the control range DSR overlap each other.

Figure 8A:
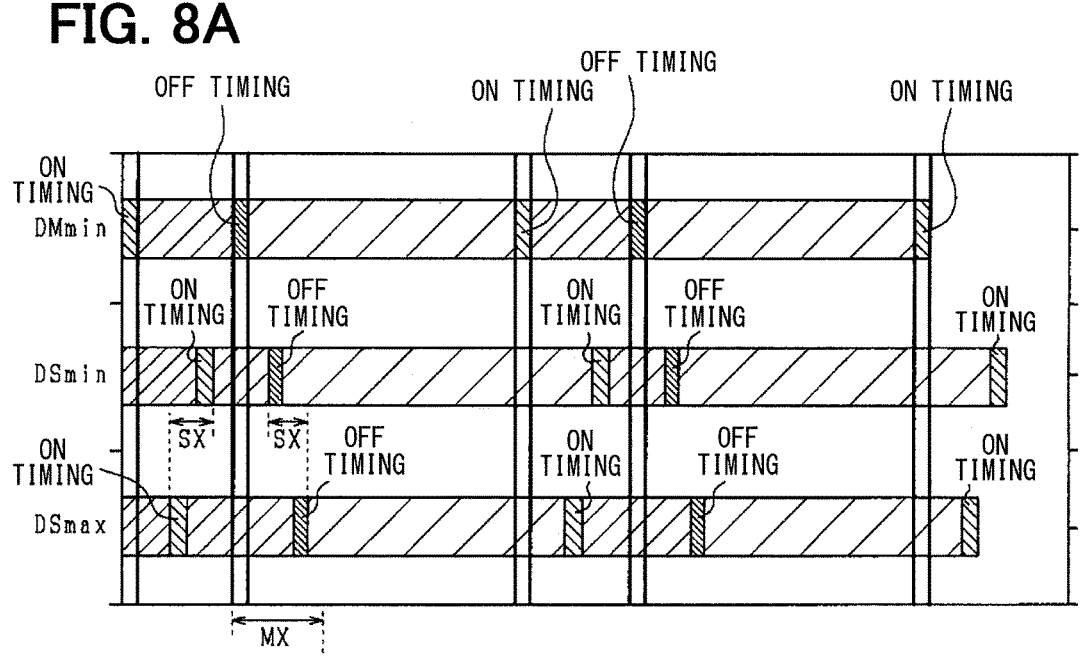
FIG. 8A is a diagram showing switching timings of a slave when a duty command value of a master is a maximum value.
Figure 8B:
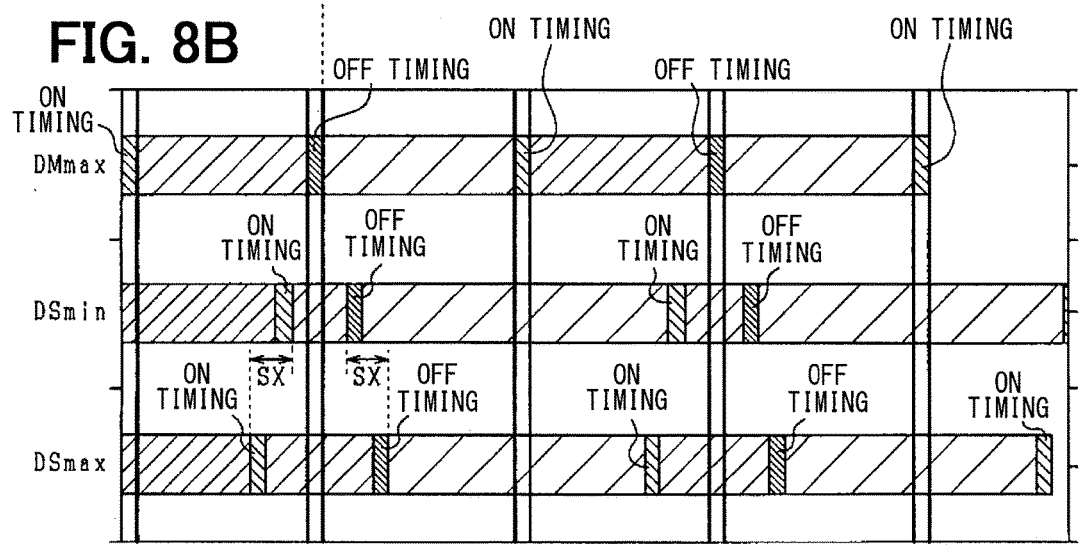
FIG. 8B is a diagram showing switching timings of a slave when a duty command value of a master is a minimum value.

FIG. 8A and FIG. 8B show switching timings in a case where the switching elements Sa1, Sb1 are respectively operated with duties DM, DS in the control ranges DMR, DMS when the synchronization is performed. In FIG. 8A and FIG. 8B, the off-timing of the switching element Sa1 of the master converter 41 and the timing of the crest of the carrier CS of the slave converter 42 are synchronized as an example.

FIG. 8A shows the switching timings in a case where the duty command value of the switching element Sb1 is set to DSmin and DSmax when the duty command value DM of the switching element Sa1 is set to DMmin. When the off-timing of the switching element Sa1 and the crest of the carrier CS are synchronized, the on-timing and the off-timing of the switching element Sb1 are generated on either side of the off-timing of the switching element Sa1. Each of regions from the on-timing and off-timing of the switching element Sb1 when DS=DSmin to the on-timing and off-timing of the switching element Sb1 when DS=DSmax are is the switching timing region SX corresponding to the control range DSR. The switching timing region SX is located between the off-timing and the on-timing of the switching element Sa1 and does not overlap the on-timing of the switching element Sa1.

FIG. 8B shows the switching timings in a case where the duty command value DS of the switching element Sb1 is set to DSmin and DSmax when the duty command value DM of the switching element Sa1 is set to Dmax. In FIG. 8B, a period from the off-timing to the on-timing of the switching element Sa1, that is, a period during which the switching element Sa1 is in an off-state is shorter than the period in FIG. 8A. A region from the off-timing of the switching element Sa1 when DM=DMmin to the off-timing of the switching element Sa1 when DM=DMmax is a switching timing region MX corresponding to the control range DMR.

As described above, even if the off-timing of the switching element Sa1 is changed in the switching timing region MX, the switching timing region SX of the switching element Sb1 does not overlap the on-timing of the switching element Sa1. Therefore, when the synchronization of the on-timing of the switching element Sa1 and the crest of the carrier CS is performed, in a case where the output voltage VH is equal to or higher than the threshold value, the off-timing of the switching element Sa1 does not overlap the on-timing and the off-timing timing of the switching element Sb1 either. Thus, by the above-described synchronization, there is no risk that a voltage over the breakdown voltage is applied to the switching elements.

The same is true in a case where a synchronization of the on-timing of the switching element Sa1 and the timing of the trough or the crest of the carrier CS is performed or a case where a synchronization of the switching timing of the slave converter 42 and the crest or the trough of the carrier CM is performed. In a case where the above-described synchronization is performed and at least one of the switching element Sa1, Sb1 is operated outside the control range DMR, DMS, there is no problem even if the switching timings of the two boost converters overlap each other. In other words, there is no problem even if the switching timing of one of the boost converters which is not synchronized with the crest or the trough of the carrier of the other of the boost converters overlaps the switching timing of the other of the boost converters.

Next, a phase control in a case where the duty command value DM changes during the synchronization will be described with reference to FIG. 4, FIG. 9A and FIG. 9B. In FIG. 9A, the duty command value DM and the carrier CM of the master converter 41 are indicated by solid lines. In addition, in a period after the duty command value DM changes, the duty command value DM before change is indicated by a dot-dash line. In FIG. 9B, the duty command value DS and the carrier CS of the slave converter 42 and the on-off state of the switching element Sb1 are indicated by solid lines, and the carrier CS before change is indicated by a dot-dash line.

In FIG. 9A, the on-timing of the switching element Sa1 and the crest of the carrier CS of the slave converter 42 are synchronized at time t0, and the duty command value DM changes at time t1. Based on the change of the duty command value DM, the switching timing of the switching element Sa1 is shifted by a time change amount $\Delta t$. Thus, unless the carrier CS is changed, the on-timing of the switching element Sa1 and the crest of the carrier of the slave converter 42 are unsynchronized as shown by the dot-dash line in FIG. 9B. Eventually, there is a risk that the switching timing region MX of the switching element Sa1 and the switching timing region SX of the switching element Sb1 overlap each other.

Thus, when the duty command value DM changes, the control portion 33 controls the phase of the carrier CS based on the change amount of the duty command value DM and performs a synchronization again. Specifically, the control portion 33 includes functions of a delay portion 331, a change amount calculating portion 332, and a converting portion 335.

The delay portion 331 delays the duty command value DM calculated by the PI control portion 316 by one operation period. The change amount calculating portion 332 calculates a change amount of the duty command value DM in a present operation period with respect to the duty command value DM in a last operation period. The converting portion 335 converts the change amount of the duty command value DM calculated by the change amount calculating portion 332 into the time change amount $\Delta t$ which is a value on a time axis. The converting portion 335 outputs the calculated time change amount $\Delta t$ to the triangular wave generating portion 322 in the slave switching portion 32. The triangular wave generating portion 322 shifts the phase of the carrier CS by the time change amount $\Delta t$. Accordingly, the on-timing of the switching element Sa1 and the crest of the carrier CS are synchronized again.

Specifically, when the duty command value DM changes at time t1, the time change amount $\Delta t$ is calculated. At time t2 at which the carrier CS becomes a trough for the first time after time t1, the phase of the carrier CS is shifted by the time change amount $\Delta t$. As a result, the timing of the trough of the carrier CS changes from time t2 to time t3. In a case where a timing at which the carrier CS becomes a crest for the first time is earlier than the timing at which the carrier CS becomes the trough for the first time, the timing of the crest of the carrier CS is shifted by the time change amount $\Delta t$ at the timing at which the carrier CS becomes the crest.

When the timing of the crest of the carrier CS also changes from a time t4 to time t5 due to the change of the timing of the trough of the carrier CS from time t2 to time t3, the on-timing of the switching element Sa1 and the crest of the carrier CS are synchronized again at time t5. The phase of the carrier CS is shifted only once, and the period Ts of the carrier CS is not changed. Thus, until the duty command value DM changes again, the synchronization of the on-timing of the switching element Sa1 and the crest of the carrier CS is maintained.

Figure 10:
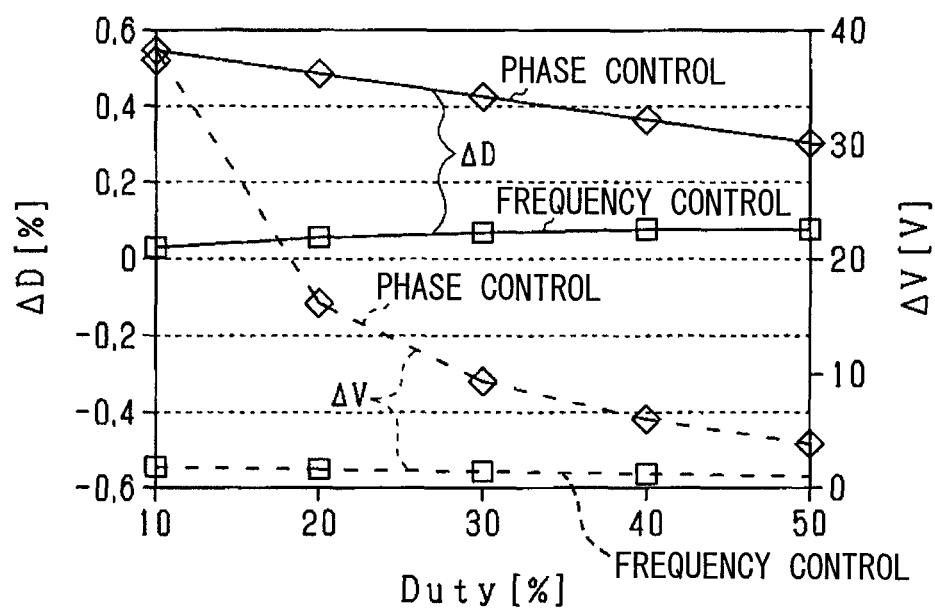
FIG. 10 is a diagram showing a duty change amount and a voltage change amount in each of a phase control and a frequency control.

When the phase of the carrier CS is shifted by $\Delta t$ at time t2, the duty of the switching element Sb1 changes from D to D2. The change amount $\Delta D = D2-D = \{(Ts \cdot D + \Delta t)/(Ts + \Delta t)\} - D = \{(1-D) \cdot \Delta t\}/(Ts + \Delta t)$. FIG. 10 shows a relationship between the change amount $\Delta D$ and the change amount $\Delta V$ of the voltage corresponding to the change amount $\Delta D$, and the duty D.

Although it is not shown in the drawings, the control portion 33 also calculates the time change amount $\Delta t$ based on the change amount of the duty command value DS and outputs the calculated time change amount $\Delta t$ to the triangular wave generating portion 312 of the master switching portion 31. Accordingly, when the duty command value DS of the slave converter 42 changes, the phase of the carrier CM of the master converter 41 is shifted, and the synchronization is performed.

According to the first embodiment, the following effects (i)-(iv) can be obtained.

(i) Because the switching timing of the master converter 41 and the switching timing of the slave converter 42 are shifted from each other, generation timings of surge voltages of the two boost converters are shifted from each other. Thus, a superimposition of the surge voltages of the two boost converters is avoided, and a voltage applied to the switching elements can be restricted while restricting a loss.

(ii) The master converter 41, the slave converter 42, the first inverter 43, the second inverter 44, and the MGECU 30 are formed as one unit. Thus, compared with a case where the master converter 41 and the slave converter 42 are formed as separate units, a wiring connecting the two boost converters is short. Thus, if the surge voltages of the two boost converters are superimposed on the high voltage line shared by the two boost converters, the surge voltage is likely to be large. However, because the switching timings of the two boost converters are shifted from each other, the generation timings of the surge voltages of the two boost converters are shifted from each other. Thus, a superimposition of the surge voltages of the two boost converters can be avoided, and the surge voltage can be restricted.

(iii) The off-timing or the on-timing of one of the boost converters is synchronized with the crest or the trough of the carrier of the other of the boost converters. Accordingly, one of the off-timing and the on-timing of the one of the boost converters and the switching timing of the other of the boost converters are shifted from each other. In addition, due to the above-described synchronization, the other of the off-timing and the on-timing of the one of the boost converters and the switching timing of the other of the boost converters are also shifted from each other. Thus, due to the above-described synchronization, the switching timings of the two boost converters are shifted from each other and a superimposition of the surge voltages of the two boost converters can be avoided while preventing a breakdown of a current balance.

(iv) Based on the change amount of the duty command value with respect to one of the boost converters, the phase of the carrier of the other of the boost converters is controlled, and the above-described synchronization is performed. Accordingly, even when the switching timing of the one of the boost converters changes, the switching timings of the two boost converters can be shifted from each other while restricting a breakdown of the current balance.

(Second Embodiment)

An MGECU 30 according to a second embodiment of the present disclosure will be described with a focus on differences from the MGECU 30 according to the first embodiment. In the first embodiment, the phase of the carrier CS is controlled and the synchronization is performed again when the duty command value DM changes. On the other hand, in the present embodiment, the frequency of the carrier CS is controlled and the synchronization is performed again when the duty command value DM changes.

In FIG. 9C, the duty command value DS and the carrier CS of the slave converter 42 and the on-off state of the switching element Sb1 in a case where the frequency control is performed are indicated by solid lines, and the carrier CS before the frequency change is indicated by a dot-dash line.

In the present embodiment, the converting portion 335 of the control portion outputs the calculated time change amount Δt to a period change portion 329 of the slave switching portion 32. The period change portion 329 changes the period Ts of the carrier CS into Ts+Δt.

Specifically, when the duty command value DM changes at time t1, the time change amount Δt is calculated. At t2 at which the carrier CS becomes a trough for the first time after time t1, a period to t6 at which the carrier CS becomes a trough next time is changed from the period Ts to the period Ts+Δt. As a result, the timing of the trough of the carrier CS changes from time t6 to time t7. In a case where a timing at which the carrier CS becomes a crest for the first time is earlier than a timing at which the carrier becomes the crest for the first time after time t1, a period from a timing at which the carrier CS becomes the crest for the first time to a timing at which the carrier CS becomes a crest next time is shifted by the time change amount Δt.

When the timing of the crest of the carrier CS changes to time t8 due to the change of the timing of the trough of the carrier CS from time t6 to time t7, the on-timing of the switching element Sa1 and the crest of the carrier CS are synchronized again at time t8. The period of the carrier CS is changed to Ts+Δt for one period, and is returned to the period Ts after that. Thus, until the duty command value DM changes again, the synchronization of the on-timing of the switching element Sa1 and the carrier CS is maintained.

When the trough of the carrier CS is shifted by Δt at time t6, the duty of the switching element Sb1 changes from D to D3. The change amount ΔD=D3−D={Ts·D+(D·Δt)/2}/{Ts+(D·Δt)/2}−D={(D/2)·(1−D)·Δt}/{Ts+(D·Δt)/2}. FIG. 10 shows a relationship between the change amount ΔD and the change amount ΔV of the voltage corresponding to the change amount ΔD, and the duty D. In a case where the frequency control is performed, the change amount ΔD of the duty D and the change amount ΔV of the voltage are smaller than the change amounts in a case where the phase control is performed.

Although it is not shown in the drawings, the control portion 33 also calculates the time change amount Δt based on the change amount of the duty command value DS and outputs the calculated time change amount Δt to the master switching portion 31. Accordingly, when the duty command value DS of the slave converter 42 changes, the frequency of the carrier CM of the master converter 41 is shifted, and the synchronization is performed.

According to the second embodiment, the following effect (v) can be obtained in addition to the above-described effects (i)-(iii).

(iv) Based on the change amount of the duty command value with respect to one of the boost converters, the frequency of the carrier of the other of the boost converters is controlled, and the above-described synchronization is performed. Accordingly, even when the switching timing of the one of the boost converters changes, the switching timings of the two boost converters are shifted from each other while restricting a breakdown of the current balance.

(Third Embodiment)

An MGECU 30 according to a third embodiment of the present disclosure will be described with a focus on differences from the MGECU 30 according to the first embodiment.

In the first embodiment, the synchronization of the switching timing of one of the boost converters and the crest or the trough of the carrier of the other of the boost converters is performed. Then, the carrier is controlled based on the change of the duty command value, and the synchronization is performed again. On the other hand, in the present embodiment, with respect to the carrier of one of the boost converters, the carrier of the other of the boost converters is shifted by a predetermined phase ΔP and is fixed.

Figure 11:
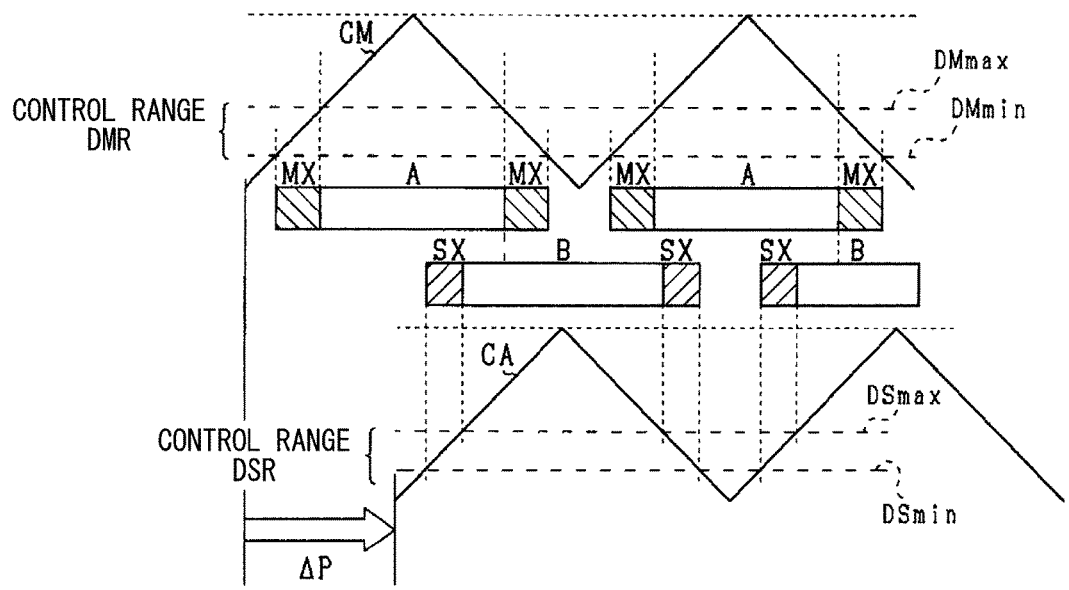
FIG. 11 is a diagram showing switching timing regions of a master and a slave according to a third embodiment.
Figure 12:
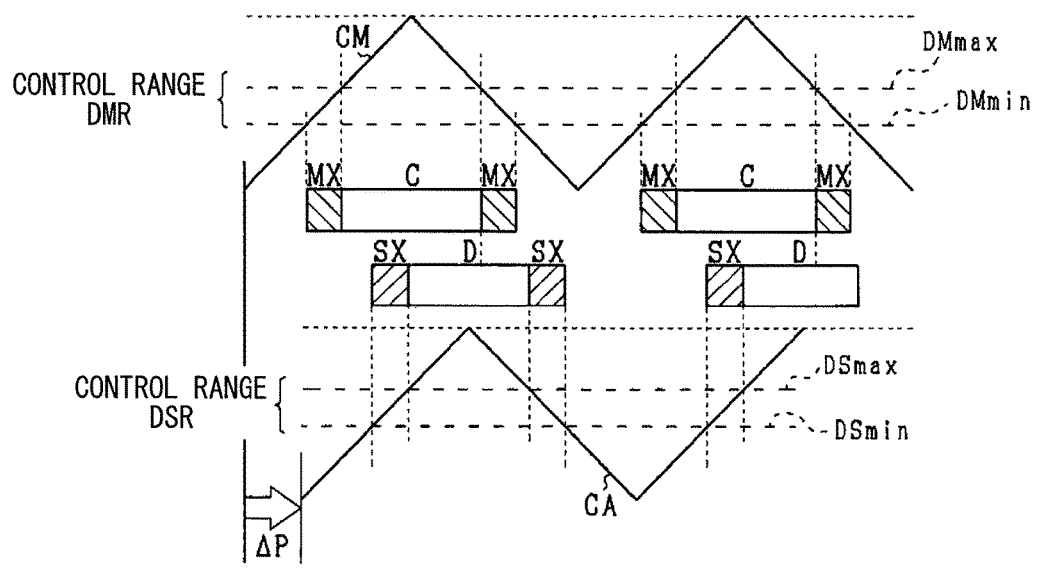
FIG. 12 is a diagram showing switching timing regions of the master and the slave according to the third embodiment.

FIG. 11 and FIG. 12 show the switching timing region MX corresponding to the control region DM of the master converter 41 and the switching timing region SX corresponding to the control region DSR of the slave converter 42 according to the present embodiment. The control portion 33 shifts the carrier CS by the predetermined phase ΔP with respect to the carrier CM, or shifts the carrier CM by the predetermined phase ΔP with respect to the carrier CS, and fixes a phase difference so that the switching timing region MX and the switching timing region SX do not overlap each other.

As shown in FIG. 11 and FIG. 12, the switching timing region of the master converter 41 corresponding to the entire region of the output voltage VH is a combination of the switching timing region MX and a switching timing region A. In an example of the first embodiment, a region corresponding to the range of the duty command value DM from 30.8% to 84.2% is the switching timing region MX, and a region corresponding to the range of the duty command value DM from 84.2% to 100% is the switching timing region A. The switching timing region of the slave converter 42 corresponding to the entire range of the output voltage VH is a combination of the switching timing region SX and a switching timing region B.

As described in the first embodiment, there is no problem unless the switching timing region MX and the switching timing region SX overlap each other. In other words, there is no problem even if the switching timing region A and the switching timing region SX overlap each other or the switching timing region MX and the switching timing region B overlap each other.

In a case where the phase difference of the carrier CM and the carrier CS is fixed as described above, even when the duty command values DM, DS change within the control regions DMR, DSR, the switching timings of the boost converters are shifted from each other while maintaining the phase difference of the carriers. Thus, the phase control according to the first embodiment and the frequency control according to the second embodiment are unnecessary.

However, when the switching timing region MX and the switching timing region SX are relatively large, it is difficult to shift one carrier from the other carrier by the phase ΔP and to fix a phase difference. In such a case, it is desirable to apply the first embodiment and the second embodiment.

According to the third embodiment, the following effect (vi) can be obtained in addition to the above-described effects (i) and (ii).

(vi) Even if the duty command values DM, DS change, an issue that a voltage over the breakdown voltage is applied to the switching elements can be restricted while fixing the phase difference between the carrier CM and the carrier CS.

(Other Embodiments)

Each of the switching element Sa2 of the master converter 41 and the switching element Sb2 of the slave converter 42 may be only diode.

What is claimed is:

1. A control device of a power supply system that includes two boost converters, the two boost converters boosting inputted direct-current voltages to predetermined output voltages with output ends of the two boost converters connected in parallel with each other, the control device comprising:
   a switching portion controlling switching of a switching element of each of the two boost converters; and
   a control portion shifting switching timings of the switching elements of the two boost converters from each other,
   wherein the switching timing is a timing of an intersection of a duty command value to each of the two boost converters and a carrier wave that is a triangular wave, and
   the control portion performs a synchronization of the switching timing from on to off or from off to on of one of the two boost converters and a crest or a trough of the carrier wave of the other of the two boost converters, and
   when the duty command value to one of the two boost converters changes, the control portion controls a phase of the carrier wave of the other of the two boost converters based on a change amount of the duty command value to the one of the two boost converters and performs the synchronization.

2. A control device of a power supply system that includes two boost converters, the two boost converters boosting inputted direct-current voltages to predetermined output voltages with output ends of the two boost converters connected in parallel with each other, the control device comprising:
   a switching portion controlling switching of a switching element of each of the two boost converters; and
   a control portion shifting switching timings of the switching elements of the two boost converters from each other,
   wherein the switching timing is a timing of an intersection of a duty command value to each of the two boost converters and a carrier wave that is a triangular wave, and
   the control portion performs a synchronization of the switching timing from on to off or from off to on of one of the two boost converters and a crest or a trough of the carrier wave of the other of the two boost converters, and
   when the duty command value to one of the two boost converters changes, the control portion controls a frequency of the carrier wave of the other of the two boost converters based on a change amount of the duty command value to the one of the two boost converters and performs the synchronization.

3. A power supply unit comprising:
   two boost converters boosting inputted direct-current voltages to predetermined output voltages;
   an inverter connected to output ends of the two boost converters and converting the output voltages of the two boost converters to alternating-current voltages; and
   a control device controlling operations of the two boost converters and the inverter, the control device including:
      a switching portion controlling switching of switching elements included in the two boost converters; and
      a control portion shifting switching timings of the switching elements of the two boost converters from each other,
   wherein the switching timing is a timing of an intersection of a duty command value to each of the two boost converters and a carrier wave that is a triangular wave, and
   the control portion performs a synchronization of the switching timing of one of the two boost converters and a crest or a trough of the carrier wave of the other of the two boost converters, and
   when the duty command value to one of the two boost converters changes, the control portion controls a phase of the carrier wave of the other of the two boost converters based on a change amount of the duty command value to the one of the two boost converters and performs the synchronization.

4. A power supply unit comprising:
   two boost converters boosting inputted direct-current voltages to predetermined output voltages;
   an inverter connected to output ends of the two boost converters and converting the output voltages of the two boost converters to alternating-current voltages; and
   a control device controlling operations of the two boost converters and the inverter, the control device including:
      a switching portion controlling switching of switching elements included in the two boost converters; and
      a control portion shifting switching timings of the switching elements of the two boost converters from each other,
   wherein the switching timing is a timing of an intersection of a duty command value to each of the two boost converters and a carrier wave that is a triangular wave, and
   the control portion performs a synchronization of the switching timing of one of the two boost converters and a crest or a trough of the carrier wave of the other of the two boost converters, and
   when the duty command value to one of the two boost converters changes, the control portion controls a frequency of the carrier wave of the other of the two boost converters based on a change amount of the duty command value to the one of the two boost converters and performs the synchronization.

* * * * *